United States Patent
Drapeau

(10) Patent No.: US 8,567,114 B1
(45) Date of Patent: Oct. 29, 2013

(54) INSECT CAPTURE DEVICE AND SYSTEM

(71) Applicant: Raoul East Drapeau, Vienna, VA (US)

(72) Inventor: Raoul East Drapeau, Vienna, VA (US)

( * ) Notice: Subject to any disclaimer, the term of this patent is extended or adjusted under 35 U.S.C. 154(b) by 0 days.

(21) Appl. No.: 13/668,240

(22) Filed: Nov. 3, 2012

(51) Int. Cl.
*A01M 3/04* (2006.01)

(52) U.S. Cl.
USPC .................................. 43/136; 43/134; 43/137

(58) Field of Classification Search
USPC .................................... 43/114, 134, 136, 137
IPC ....................................... A01M 1/14,3/00, 3/04
See application file for complete search history.

(56) References Cited

U.S. PATENT DOCUMENTS

| | | | |
|---|---|---|---|
| 78,950 A * | 6/1868 | Forbes | 43/137 |
| 4,052,811 A | 10/1977 | Shuster et al. | |
| 4,126,959 A | 11/1978 | Graham | |
| 4,914,855 A | 4/1990 | Sherman | |
| 5,058,314 A | 10/1991 | Frascone | |
| 5,634,293 A | 6/1997 | Mike et al. | |
| 6,044,584 A | 4/2000 | Lynn | |
| 6,067,746 A | 5/2000 | Kistner et al. | |
| 6,185,862 B1 * | 2/2001 | Nelson | 43/136 |
| 6,651,379 B1 | 11/2003 | Nelson | |
| 7,065,919 B1 | 6/2006 | Vierra | |
| 7,165,355 B2 | 1/2007 | George et al. | |
| 7,469,501 B1 | 12/2008 | Blum | |
| 7,676,986 B2 | 3/2010 | Nelson | |
| 7,721,486 B2 | 5/2010 | Rosario | |
| 7,726,065 B2 | 6/2010 | Jacobson | |
| 8,151,515 B2 | 4/2012 | Crouse et al. | |
| 2008/0040967 A1 * | 2/2008 | Young | 43/136 |
| 2012/0180380 A1 * | 7/2012 | Grant, III | 43/136 |

FOREIGN PATENT DOCUMENTS

JP  P2000-157137 A  *  6/2000  .............. A01M 1/14

* cited by examiner

*Primary Examiner* — Darren W Ark
*Assistant Examiner* — Timothy Schwarz

(57) ABSTRACT

A device and method for capturing insect pests that rest or crawl on a surface, while keeping one's fingers away from the capture site. The capture device is a rectangular sheet that is coated on one side with a high-tack adhesive, and on the other side with a release coating so that the sheets can be provided in a stack. Using a handling tab, the capture sheet is inserted into grooves in a holder which is mounted at one end of a handle. Disposal of the entrapped insect can be accomplished by removing the sheet by hand or by holding the handle so that the capture sheet is vertical and letting it drop away from the holder.

3 Claims, 3 Drawing Sheets

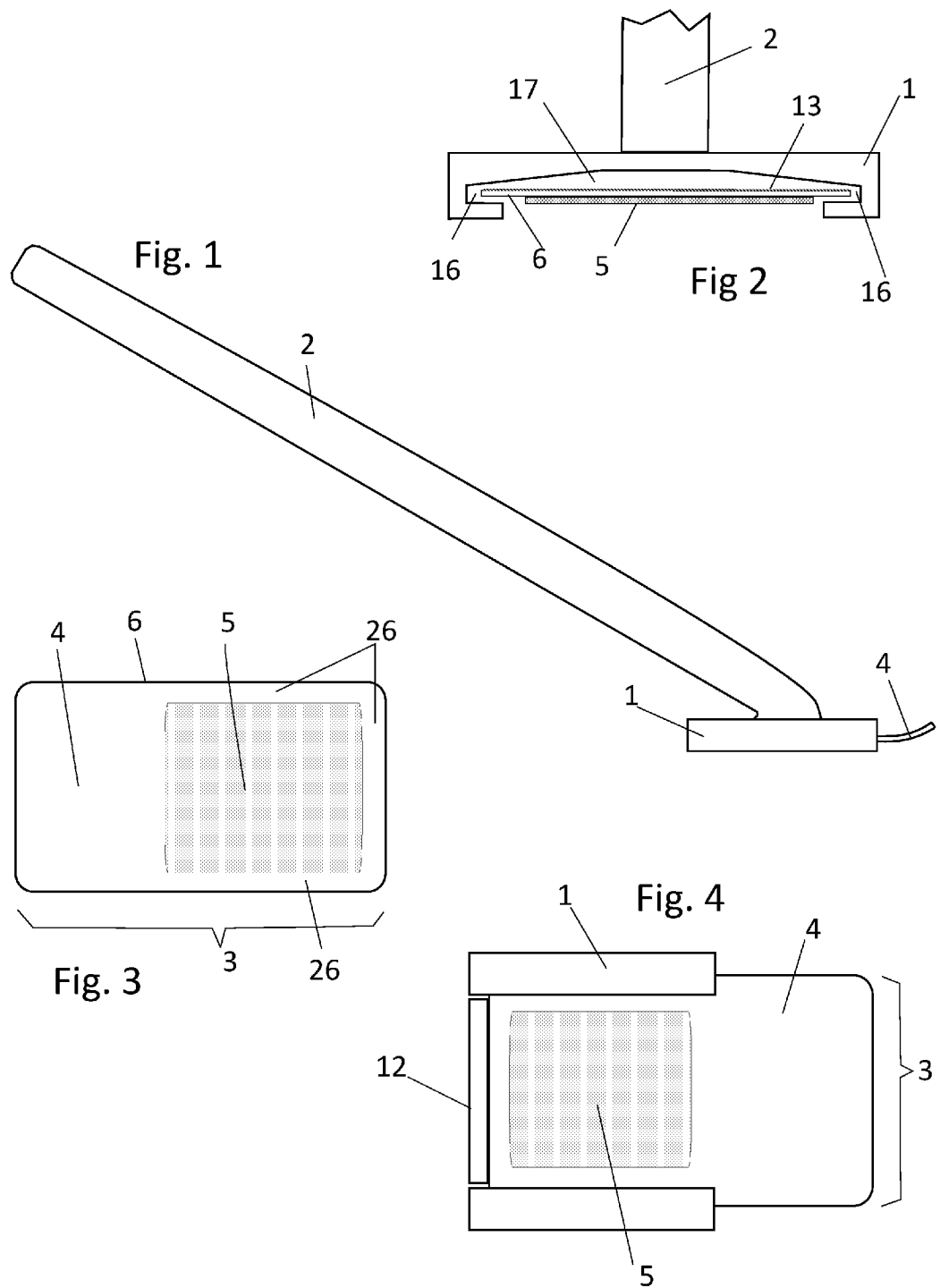

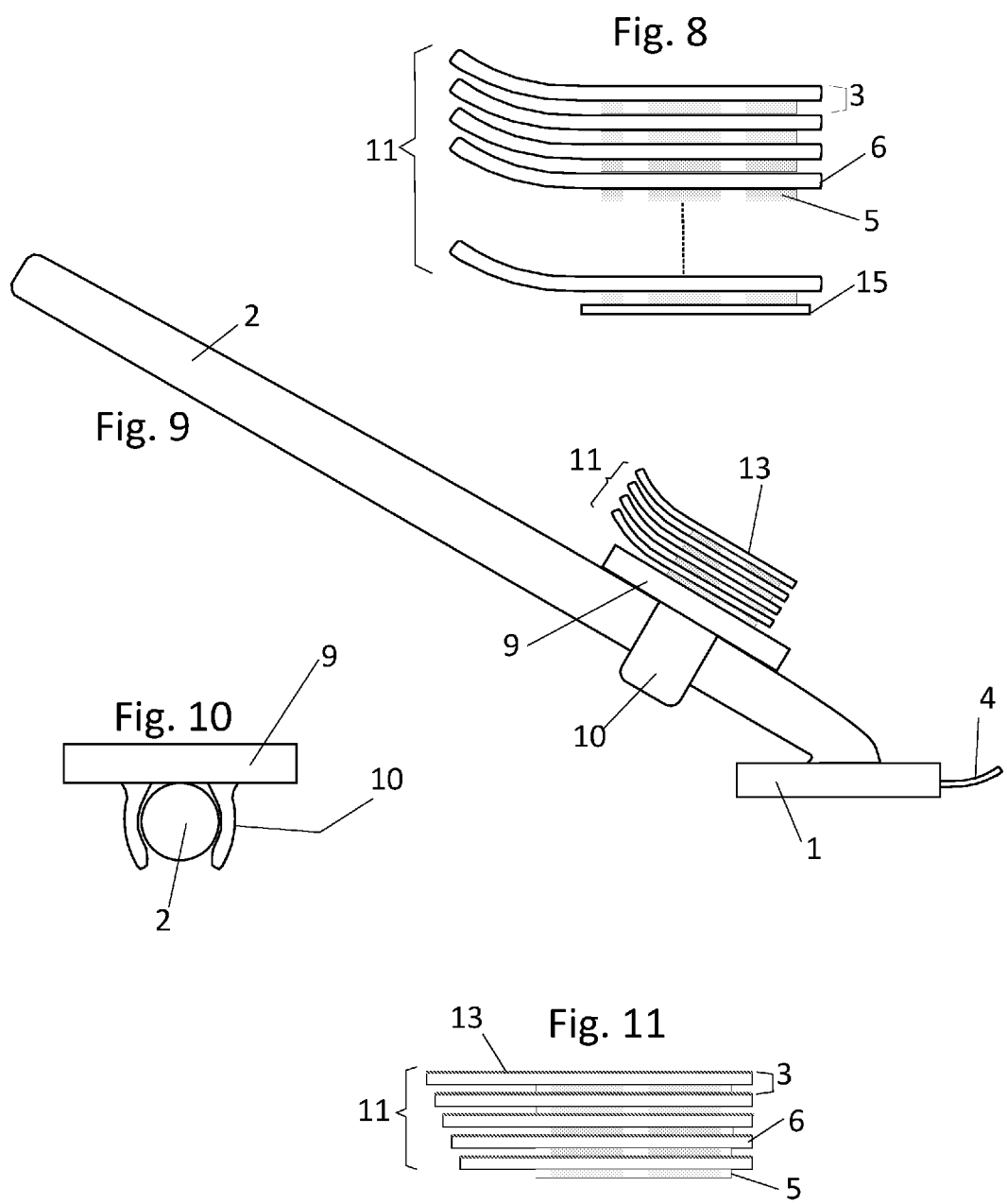

INSECT CAPTURE DEVICE AND SYSTEM

FIELD OF THE INVENTION

This invention relates to an improvement in the capture and control of individual crawling insect pests.

DESCRIPTION OF RELATED ART

There are many inventions that relate to the killing of individual insect pests by insecticide spray or crushing. There is a smaller number that provide a simple means to capture and dispose of insect pests without crushing or poisoning them.

Some conventional devices capture insect and pests with adhesive-coated sheets, similar in concept to fly paper, and mounted in a variety of ways in a hand-held device. However, most of these are complex devices that are difficult or cumbersome to use and would not be inexpensive to manufacture.

BACKGROUND OF THE INVENTION

There are many unwanted and harmful insects such as beetles, bugs, spiders and millipedes to name a few, that can be found in households and which the resident desires to eliminate. In addition, with the advent of global warming, there is also a migration of insects and other vermin into areas where they were never common before.

The usual method of ridding the home of them is to smash them with the foot or by using a device such as a fly swatter or rolled-up newspaper. If the homeowner is fast enough, this can kill the offending insect, but also leaves an unsightly mess on the surface that must be cleaned up. Insecticide sprays are also available, but can leave a poisonous residue on the surface being sprayed, to later affect humans or pets. In both cases, the dead insect must now be gathered up, which can be difficult and unhygienic.

In addition to the mess of a dead insect, there is also the problem of odor. Some insects, notably the stinkbug, or pentatomoidea, is a new pest in many temperate areas, and gives off an offensive odor when squashed, which serves as an attractant for more of its species, and thus is to be avoided.

Ideally, it would be advantageous to have a method that simply and cleanly snatches the insect up off the surface, leaving no chemical or biological residue. There is prior art that employs a vacuum principle, but these devices are relatively complex, bulky and expensive. The need exists for a device and method to accomplish the goal of removing such pests quickly, safely, easily and inexpensively.

BRIEF SUMMARY OF THE INVENTION

The current invention consists of a handle with a holder component mounted at one end. The holder retains a rectangular capture sheet that is coated on one side with a tacky adhesive coating. Gripping the sheet by an un-coated handling tab, it is inserted into grooves on the underside of the holder with the sticky side facing outward. While holding the handle, the holder with its capture sheet is pressed against the insect, thereby entrapping it.

The design of the holder has a unique feature in the form of a concave inner under surface that enhances the capture. After capture, the capture sheet with entrapped insect is removed for disposal by pulling it out of the grooves or more simply, by turning the handle so that the sheet drops out.

BRIEF DESCRIPTION OF THE DRAWINGS

FIG. 1 shows a side view of the insect capture device according to the preferred embodiment of the invention.

FIG. 2 is a front view of the holder 1 shown in FIG. 1.

FIG. 3 is a view of one side of a capture sheet according to the preferred embodiment of the present invention.

FIG. 4 is a view of the underside of the holder showing the capture sheet.

FIG. 8 is a side view of a stack of capture sheets.

FIG. 9 is a side view of the insect capture device with the capture sheet stack platform 9 to which a capture sheet stack 11 is held in place by the adhesive coating on the bottom-most capture sheet.

FIG. 10 is a front view of the capture sheet stack platform held in place on the handle by a clip.

FIG. 11 is a side view of a stack of capture sheets showing a base sheet 6 and adhesive coating wherein each sheet in the stack is slightly offset (exaggerated here) from the next.

DETAILED DESCRIPTION OF THE INVENTION

Figure 5:
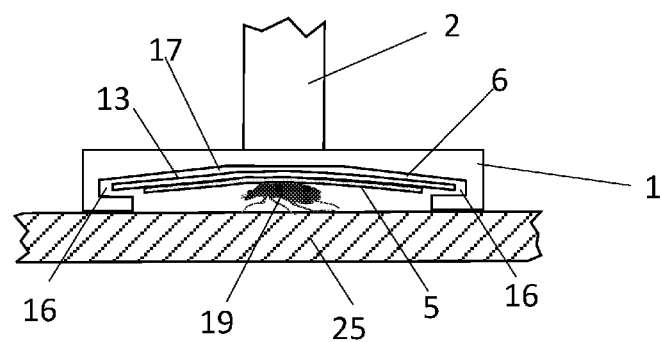
FIG. 5 is a front view of the insect capture device and capture sheet holder 1 and partial view of the lower portion of handle 2, while in use.

FIG. 1 illustrates a side view of the insect capture device with the handle 2, the holder 1, and the holding tab 4 of the capture sheet (not completely shown here) emerging from the front of the holder. As shown, the handle 2 is an elongated tube or rod fixed at one end to the holder 1. The handle 2 may be pivotally or fixedly connected to the holder 1. Additionally, the handle 2 may be formed as a telescoping device (not shown) whereby its length may be adjusted by a user.

FIG. 2 is a front view of the holder 1, the lower portion of the handle 2, the grooves 16 in the underside of the holder, the concave cavity 17 above the capture sheet's base sheet 6, the adhesive coating 5, and a release coating 13 on top of the base sheet. Note that the layers are not necessarily shown in their correct relative thicknesses. As shown, the holder 1 is formed as a generally planar member having a cavity 17 and grooves 16 to receive a capture sheet 3 along opposite lateral edges of the base sheet 6. The cavity 17 is formed as a concave cavity 17 to accommodate bending of the capture sheet 3 as will be described below.

FIG. 3 is a view of one (sticky) side of a capture sheet 3, showing the base sheet 6, handling tab 4, the adhesive coating 5, and the uncoated area 26, at the sides and end.

FIG. 4 is a bottom view of the underside of the holder 1 with a capture sheet 3 inserted into the grooves 16 (see FIG. 2) in the underside of the holder. The capture sheet 3 is formed with a holding tab 4 that is void of adhesive to permit handling by a user. A portion of the capture sheet 3 is provided with the adhesive coating 5. In the preferred embodiment, the holder 1 is provided with a stop 12 which prevents the capture sheet from exiting out the back of the holder 1. The stop 12 may be formed in a variety of shapes.

FIG. 5 is a front view of the capture sheet holder 1 and the lower portion of handle 2, while in use. Note that the body of the insect 19, resting on the surface 25, has deformed the capture sheet 3 into the recessed concave cavity 17. Again, it is noted that the capture sheet 3 consists of the base layer 6, adhesive coating 5, and a release coating 13, thereby reducing the size of the cavity 17 and by means of the restoring force created, helping to further secure the insect to the adhesive coating.

Figure 6:
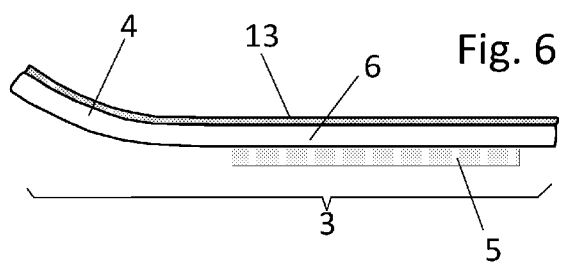
FIG. 6 is a side view of a single capture sheet according to the invention.

FIG. 6 is a side view of a single capture sheet 3, showing the handling tab 4, the base sheet 6, the adhesive coating 5 and a release layer 13 which serves to allow a stack of such sheets to be created from which capture sheets may be removed one-at-a-time. For ease of manufacturing, the release layer 13 will usually cover the entire base sheet 6. In another embodiment, the release layer 13 is disposed only on a portion of the base sheet 6 or is completely omitted.

Figure 7:
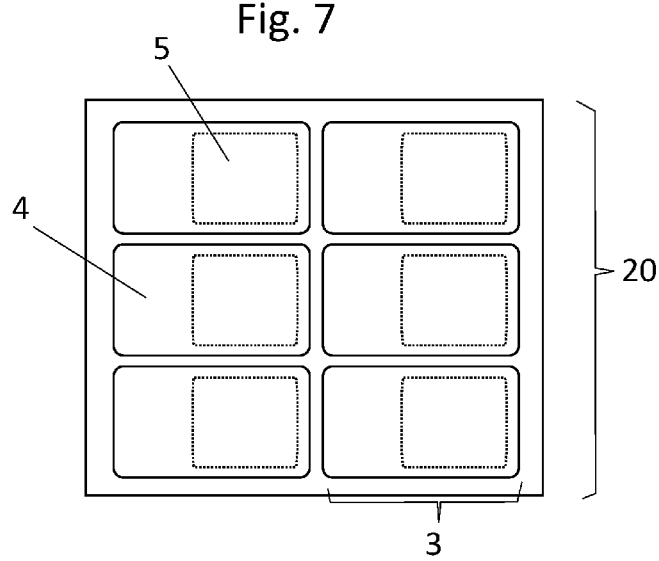
FIG. 7 is a top view of a batch of multiple individual capture sheets showing the holding tabs and the adhesive coating.

FIG. 7 is a top view of a batch 20, of multiple individual capture sheets, showing the holding tabs 4 and the adhesive coating 5, which is shown facing downward on the reverse side of each individual capture sheet. The number of capture sheets in a batch can be any convenient number.

FIG. 8 is a side view of a stack 11, of capture sheets 3, showing the tabs 4, the base sheet 6, and the adhesive coating 5. A bottom-most release sheet 15 may be used to protect the lowest adhesive coating until ready for mounting on the platform 9 (see FIG. 9).

FIG. 9 is a side view of the insect capture device with the capture sheet stack platform 9, to which a capture sheet stack 11 is held in place by the adhesive coating 5 on the bottom-most capture sheet. The platform 9 is held in place on the handle 2, by the clip 10 by a frictionfit connection. Of course, the clip may be disposed and secured on the handle 2 by a number of other means known to those of skill in the art.

FIG. 10 is a front view of the capture sheet stack platform 9, held in place on the handle 2 by the clip 10. A more permanent method may also be used such as adhesive or thermal bonding, or even being a molded part of the handle, 2.

FIG. 11 is a side view of a stack of capture sheets 3, showing the base sheet 6 and adhesive coating 5. To facilitate removal of the topmost capture sheet, each sheet in the stack is slightly offset (exaggerated here) from the next.

As described with reference to FIGS. 1-11, the capture device includes a short handle 2 that has a small, flat platform attached to one end. This platform will be called the capture sheet holder 1.

A capture sheet 3, made from a piece of fairly stiff paper with a high-tack, sticky adhesive coating on one side, and a release coating (typically silicone) is held in place on the underside of the platform or holder 1.

The capture sheets 3 are placed in the holder 1, and held in place by a temporary mechanical attachment in the form of grooves 16 in the internal sides of the holder 1 into which the capture sheet 3 is slid. The sticky side of the capture sheet 3 faces outward towards the insect.

To insert the capture sheet 3 into the holder 1, the user simply grips an uncoated handling tab at one end of the capture sheet 3 which aids inserting the capture sheet 3 into the grooves 16 in the undersides of the holder 1. The tab is similar in size to the tip of a finger and once inserted into the grooves 16, will stick out from the holder 1. The tab 4 also makes it easier to pull the used capture sheet 3 out of the holder 1 for disposal.

The capture sheet 3 is slightly narrower and thinner than the space formed by the grooves 16 in the sides, so that the sheet 3 can be easily slid into place and later removed with the captured insect for disposal.

A further improvement in the design of the holder 1 to facilitate insertion of the capture sheet, is to chamfer (or bevel) the grooves at the throat, or entry point of the grooves.

The inside lower surface of the capture sheet holder's platform is not flat, but is slightly concave. As a result, it will accommodate the shape of a captured insect better, and as force is applied by the user, will increase the amount of adhesive material in contact with the insect's body, thereby enhancing the capture. The concavity would also help avoid crushing the insect, with its attendant mess on the wall or counter surface. For typical target insects, this design would require a maximum gap between the top uncoated surface of the capture sheet and the underside of the platform of about 1/8".

In use, the handle 2 is held by the consumer and the holder is pressed down against an insect that is resting on a flat surface. The insect thus becomes trapped by the stickiness on the surface of the capture sheet. If it struggles to get away while the holder is held down, its struggles will help secure the capture by further enmeshing the creature. Because the side of the insect facing the sticky surface of the capture sheet is its top side rather than its legs, there is the maximum amount of surface area to be engaged by the adhesive and the legs, which otherwise might aid in the struggle, are neutralized.

The captured insect may be disposed of by removing the capture sheet 3 from the platform by gripping the uncoated handling tab and placing it in the trash, or simply turning the handle so that the capture sheet is oriented vertically and drops out of the holder unaided. If the sheet is made from a biodegradable material, it can be disposed of by flushing it down the toilet.

To prevent the capture sheet's adhesive coating from coming into contact with the grooves and thereby interfering with capture sheet insertion or removal, the adhesive coating does not extend as far as the lower edge of the grooves that hold it in place.

The grooves 16 in the undersides of the holder are designed to hold the adhesive surface of the capture sheet slightly away from, or above, the surface on which the insect is resting. In this way, there is a reduced chance of fouling that surface, but still a short enough distance to be effective in capturing the insect. This separation would typically be approximately 1/16".

The capture sheets 3 are made from a base material that is thin enough to be economical, flexible enough to conform to the insect's body during capture, yet stiff enough to not sag under gravity when inserted into the platform 1.

A further refinement of the capture sheet 3 is that it could be asymmetrical in the force necessary to bend it. That is, it would be stiffer in the direction which would prevent sagging downward, but would deform more easily in the direction of a captured insect (that is, moving upward towards the base of the holder). One way to provide this function is by ridges incorporated in one side of the sheet.

There are several ways to have a supply of capture sheets available for use in this invention. They could be provided singly with an easily-removed release sheet temporarily covering the adhesive layer that prevents the sticky side from coming into contact with anything before being put into use.

Alternatively, the capture sheets 3 could be provided in a larger sheet, each such sheet containing multiple die-cut capture sheets placed with the adhesive surface face down onto a release coating. The uncoated tabs would allow each individual capture sheet to be easily removed from the group, similar to peel-and-stick postage stamps.

Another method is to provide capture sheets 3 in a stack of multiple sheets, one atop another. A release coating on the back of each capture sheet would prevent the sticky coating of the next sheet in the stack from permanently adhering to it or leaving behind a residue. The uncoated tab would aid in separating a capture sheet from the stack. Further, the tab end of the capture sheets may be slightly bent upwards to facilitate remove of the topmost sheet from the stack. In this case, a release coating on one side of the capture sheet is not required.

In the case of a stack of capture sheets 3, an adhesive coating 5 on the sheet at the bottom of the stack would be in contact with the top side of an accessory platform, and would serve to hold the stack in place on a platform that is attached to the handle. This accessory (or reserve sheet) platform would then be attached to the handle, either temporarily or permanently. If the stack is provided to the consumer separately from the platform, then a temporary release sheet can be used to protect the adhesive coating on the capture sheet 3 at the bottom of the stack before it is mounted on the platform.

The size of the capture sheets 3 could be several times the size of the largest insect expected to be encountered. Approximately 1-2" in width and length, not counting the tab or uncoated portion would be suitable. The capture sheet and/or the adhesive portion could be either square or rectangular in shape or any other suitable shape.

In order to provide a surface for instructions, graphics or promotional material, printing may be applied to either upper and/or lower surface of the capture sheet 4.

If the capture sheet platform is temporarily attached to the handle, then it would have a simple means of being securely held in place, such as by a molded clip that snaps it in place.

It should be noted that the handle 2 could be made to detach from the capture sheet holder 1.

Most consumers would prefer the handle to be relatively long, as a pencil, to remove them from close contact with the insect. For the purpose of this disclosure, the handle 2 is shown as similar in diameter and length to a pencil, but could have any convenient size or shape, and be ergonomically designed for even more effective handling. Further, the handle 2 may be telescopic to accommodate different ranges of action.

For best ergonomics, the handle may be attached to the capture sheet platform at an angle that makes for easy use. An angle of about 45 degrees would be effective. However, it is also possible to make the angle between the handle 2 and the capture sheet holder 1 adjustable and/or pivotable to achieve the most effective use.

While the foregoing invention has been shown and described with reference to preferred embodiments, it will be understood that various changes in form and detail may be made without departing from the spirit and scope of the invention.

The invention claimed is:

1. An insect capture device comprising:
   a handle;
   a holder attached to said handle;
   a capture sheet removably disposed on said holder, said capture sheet having an adhesive surface applied to said capture sheet;
   wherein said holder has a bottom formed as a generally planar shape with a recess disposed in said bottom; said holder further comprising a pair of parallel grooves formed into opposite sides of said holder adjacent said bottom;
   wherein said recess comprises a taper beginning at each of said grooves and tapering towards a center of said bottom;
   wherein said capture sheet is slidingly disposed within said grooves and a central region of said capture sheet is maintained at a predetermined distance between said center;
   wherein when a force is applied to said central region of said capture sheet, the capture sheet is deformed into said recess.

2. The capture device according to claim 1, further comprising a plurality of replacement capture sheets affixed to said device.

3. The capture device according to claim 2, wherein said plurality of replacement capture sheets is disposed on said handle.

\* \* \* \* \*